May 29, 1928.
A. L. LAMBERT
AUTOMOBILE DOOR
Filed Dec. 18, 1926    3 Sheets-Sheet 1
1,671,595
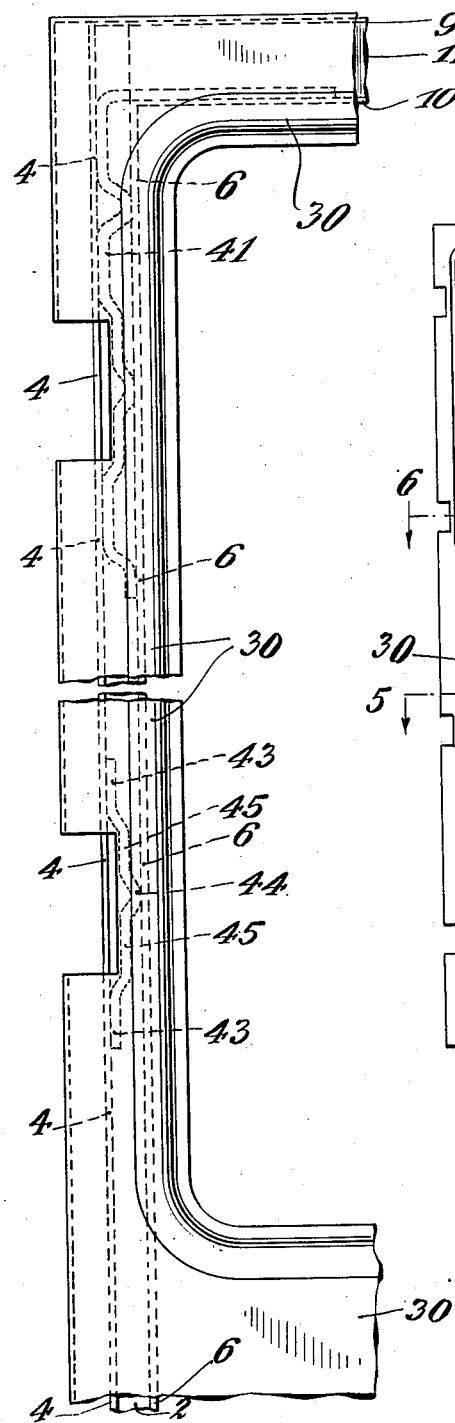
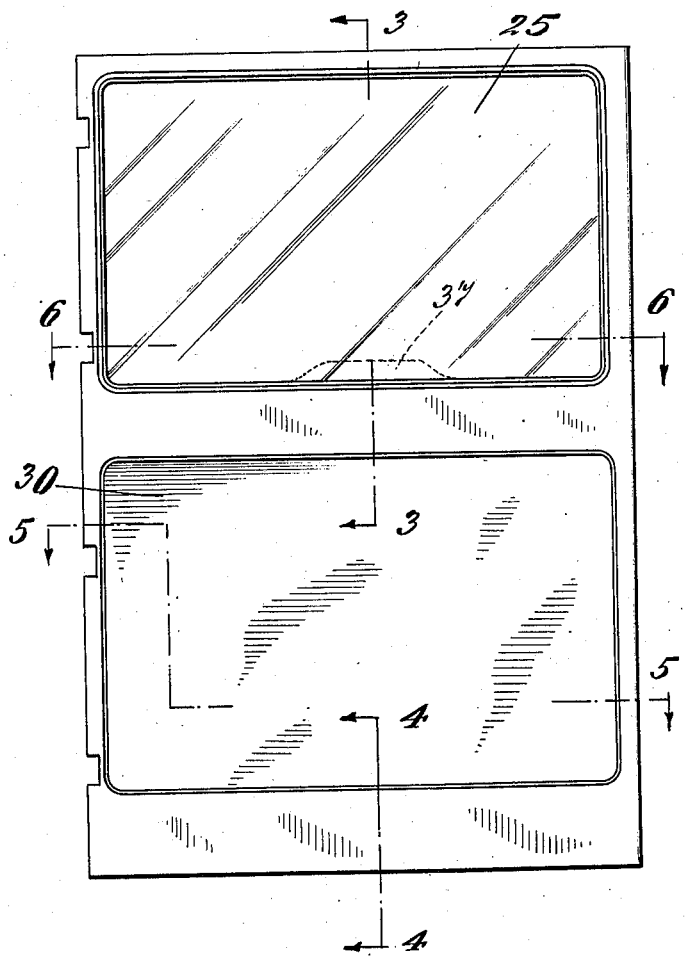
INVENTOR
Albert L. Lambert
BY
ATTORNEY May 29, 1928.  A. L. LAMBERT  1,671,595

AUTOMOBILE DOOR

Filed Dec. 18, 1926   3 Sheets-Sheet 2

INVENTOR
Albert L. Lambert
BY
ATTORNEY

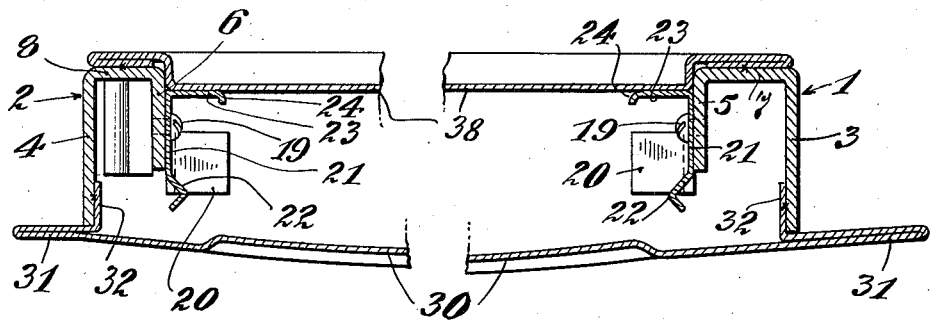
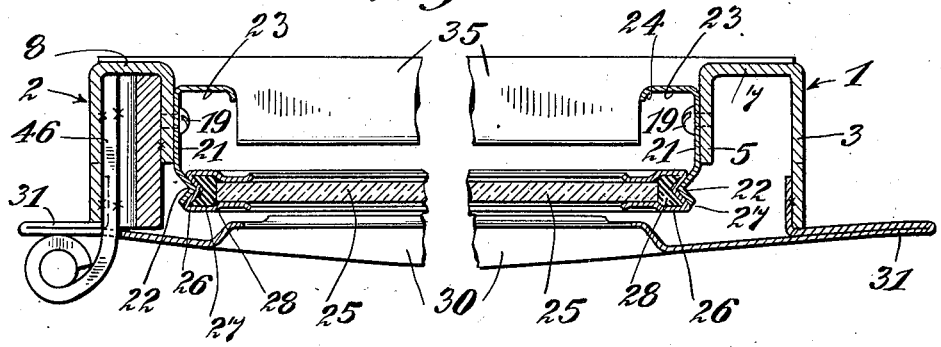
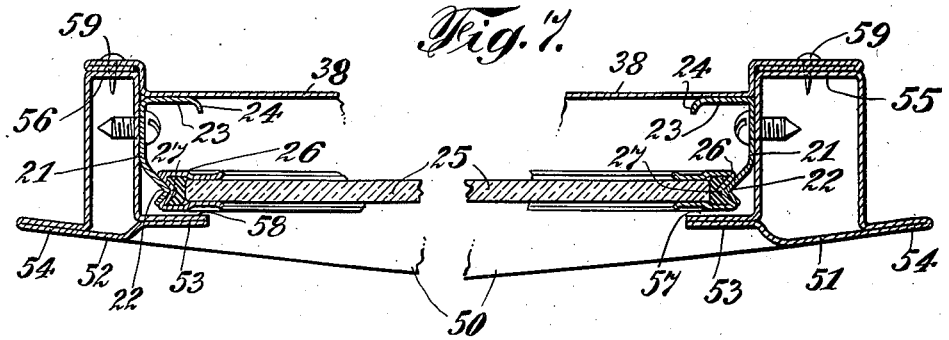

Patented May 29, 1928.

1,671,595

UNITED STATES PATENT OFFICE.

ALBERT L. LAMBERT, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

AUTOMOBILE DOOR.

Application filed December 18, 1926. Serial No. 155,570.

This invention relates to automobile doors, and more particularly relates to doors having windows which may be opened and closed. One of the principal objects of the invention is to provide a construction which incorporates a resilient runway for the window glass, whereby rattling is prevented, and at the same time the window glass is supported firmly and may be easily raised and lowered without jamming.

A further object of this invention is to provide an improved manner of attaching the outer door panel to the door frame, the parts being so constructed that the panel may be preformed with all necessary bends and flanges and may be secured to the door frame by spot-welding which does not appear on any outside surface of the door, thus simplifying the assembling operation and avoiding visible blemishes or marks which would detract from the attractive appearance of the structure.

A further object of this invention is to provide a door construction having the features referred to and which is light in weight and at the same time is sturdy and durable and not likely to become distorted by continued use; and a further object of this invention is to provide a door of the character referred to which may be quickly and easily constructed at low cost.

Other objects of this invention will be in part obvious and in part pointed out hereinafter.

In accordance with this invention, the door may be constructed of interfitting sheet metal members having overlapping flanges at the edge surfaces of the door. Preferably an opening is left at the sides and top of the door interior between the interfitting members, so that these members may be spot-welded together at the edge surfaces of the door by means of a tool inserted between them, thus permitting the spot-welding without welding marks or scars being formed on the outside surfaces of the door, and preserving an attractive appearance. The window runway is provided by resilient metal strips having ribs or ridges engaging in grooved members secured along both sides and across the top of the window glass, establishing a resilient engagement with the window frame which insures the easy raising and lowering of the window and the avoidance of rattle.

Figure 3:
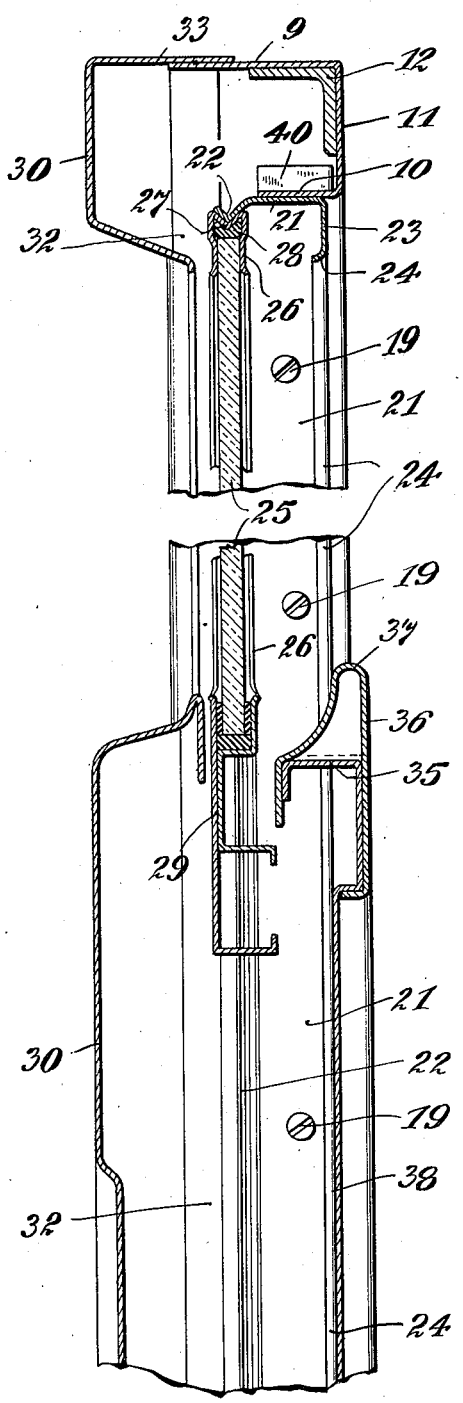
Figure 4:
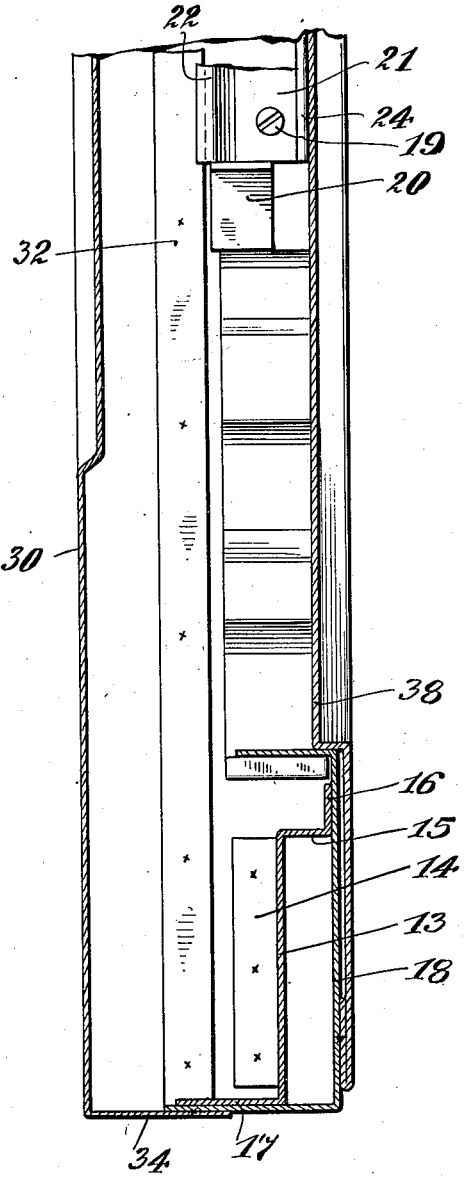

In order that a clearer understanding of this invention may be had, attention is hereby directed to the accompanying drawings forming a part of this application and illustrating certain possible embodiments of this invention. Referring to the drawings, Fig. 1 is a front view of a door embodying the invention; Fig. 2 is an enlarged view of an upper corner portion of the door, showing in dotted lines the location of certain of the hidden parts, the view being broken away at the center; Fig. 3 is an enlarged vertical sectional view, broken away at the center, and is taken approximately on the line 3—3 of Fig. 1; Fig. 4 is an enlarged vertical sectional view through the bottom portion of the door, and is taken on the line 4—4 of Fig. 1; Figs. 5 and 6 are enlarged horizontal sectional views and are taken respectively on the lines 5—5 and 6—6 of Fig. 1; and Fig. 7 is a horizontal sectional view of a door embodying this invention, but showing a modified construction of the door pillars. Similar reference characters refer to similar parts throughout the several views of the drawings.

Referring to the drawings, in the first construction the door includes two side pillars 1 and 2, each of channel shape and each having their outer walls 3 and 4 longer than their inner walls 5 and 6. The bottom walls of these channel pillars are designated respectively 7 and 8. The tops of these pillars are connected by a similar channel member having outer wall 9, inner wall 11 and bottom wall 10. Preferably the upper corner of this member is reenforced internally by an angle iron 12. The lower portions of the side pillars 1 and 2 are connected by a strip 13 which has a flange 14 at each end abutting and attached to the inner walls of the side pillars. Preferably strip 13 is reenforced along its top edge by being formed here with an angular portion 15 which includes vertical flange 16. Along the bottom of strip 13 is a horizontal flange 17. A channel member 18 fits against and is attached to the flange 16 and to the flange 17. Thus a very rigid yet light door frame is obtained.

Along each wall 5 and 6 of the side pillars 1 and 2 is attached, as by means of screws, 19, a metal strip which extends from the top cross member to a suitable window stop 20 secured to the side pillar at a suitable location in the window well. The body portion 21 of each strip lies against the pillar wall 5 or 6 but extends beyond the end thereof, and this extending portion of each strip is formed to provide a ridge or rib 22 directed inwardly of the window opening. A similar strip having base 21 and ridge or rib 22 is secured to the top cross member of the frame. Preferably the edge of each strip opposite the ridge 22 is flanged inwardly of the window opening, as at 23, and the extreme edge curved, as at 24, to conceal the base 21 of each strip, the attachment screws 19, and the extreme edge of the window glass and thus render the appearance of the construction more attractive.

Along each side of the window glass 25 and across its top edge is secured a channel-shaped edge strip 26, the sides of which overlap the glass on opposite sides, and the base of which is shaped to provide a groove 27 into which the ridges 22 of the retaining strips are adapted to fit. The retaining strips, being resilient, exert inward pressure on the edge strips 26 and hold the window against rattling. Preferably a strip 28 of resilient material is seated in the edge members 26 intermediate the edge of the glass and the grooved bottom of these members.

A suitable carrier construction 29 may be attached to the bottom edge of the window 25 whereby the window glass may be raised and lowered by suitable regulator mechanism (not shown) mounted in the door in the conventional manner.

The front panel 30 for the door may be preformed with marginal overlap portions 31 along its sides, ending in flanges 32. The top of the panel may have a horizontal flange 33, and the bottom of the panel may have a horizontal flange 34. Preferably these flanges 32, 33 and 34 are set in such position when the panel is formed that the panel can be applied to the frame in a manner quite similar to the placing of a tin cover on a tin box. The fit is such that the flanges 32 will fit against the walls 3 and 4 of the side frames, the flange 33 will fit against the wall 9 of the top cross piece and the flange 34 will fit against the bottom of the bottom cross member 18, when the panel is applied to the frame, without requiring any shaping or forming of either frame or panel at the time of assembling. The overlapping portions of these interfitting parts are firmly secured together, as by spot-welding.

Preferably an inner panel 38 is mounted on the door. This panel may extend over and be secured to the inner walls 7 and 8 of the side frame members 1 and 2, and at the bottom of the door may lie over and be secured to the cross piece 18. This panel 38 preferably does not extend higher than the bottom of the window opening. Along its top edge it may be of channel formation, as at 35, and, if desired, a member 36 may be secured to the upper edge of panel 38 to provide a pull-to handle for the door. As shown, this pull-to member comprises sheet metal formed with an upwardly extending ridge or rib 37. This constitutes the handle.

Preferably the door is reenforced at the corners and at the location of the hinges by metal strips which are secured within the channels of the frame members. Preferably at each corner of the door the strip is angular, having a horizontal arm 40 resting against and secured to the wall 10 and having a vertical arm 41 extending within the channel of pillar 2. The arm 41 is preferably corrugated or tortuous in shape so as to abut against the wall 4 at some places and to abut against the wall 6 at intermediate places. At each hinge there is a reenforcing strip of tortuous formation, having its ends 43 abutting the wall 4, a central portion 44 abutting the wall 6 and intermediate portions 45 abutting the hinge arm 46 which is disposed against the inside of wall 2.

In assembling the door, the preformed sheet metal frame members and the front panel 30 are fitted together and their overlapping portions are spot-welded together at the edge surfaces of the door, the welding tool preferably being inserted from inside the frame through the opening left between the front panel and inner walls of the frame members, the welding taking place on the inside, and thus avoiding the formation of welding marks and scars on the exposed edge surfaces of the door. After these parts have been welded together, the resilient window runway strips and the window glass may be applied. To mount the window, the runway strips are secured along one side and at the top of the door. The glass frame 26 and carrier 29 with the glass in place is then engaged with the vertical runway strip which has been attached to the door. Then the opposite runway strip is engaged with the opposite side of the glass frame and is screwed in place. Thereafter the panel 38 is applied to the door.

Instead of making the side pillars separate from the outside paneling, both pillars and the outside paneling may be made from a single piece of sheet metal pressed into shape. This modification of the construction is shown in Fig. 7. A single piece of sheet metal comprises the panel 50 extending across the door below the window opening and the side paneling 51 and 52 along both sides of the window opening, the sheet at the sides of the window opening preferably ending in flat edge portions 53. Along each side edge of the door the metal sheet is doubled upon itself to form the overhanging marginal flanges 54 and then is bent into channel form, as at 55 and 56, and ends in flanges 57 and 58 which lie against and are securely attached to the flanges 53 at the window opening. These flanges are preferably spot-welded together before the window glass has been applied, the welding tool being applied on the inside so that no welding marks will show on the outside of the door. Thus it is apparent that both side pillars and the outside paneling may be constructed of a single piece of sheet metal formed to shape. In this modification the resilient window glass retaining strips are secured to the inner walls of the channel frame portions in a manner similar to their attachment to the inner walls of the separate channel pillar members 1 and 2. The rear panel 38 may be applied to the bottoms of the channel portions 55 and 56 by means of screws 59 or by other suitable means.

Preferably in the modified construction the reenforcing members 12 and 41 are applied at the corners and at the location of the hinges similar to their inclusion in the construction first described.

From the above, it will be readily apparent that the door is exceedingly light and inexpensive in construction and at the same time is very sturdy, and continued use is not apt to cause the door to lose its shape or fit. It is further evident that by providing resilient retainers for the side and top edges of the window glass, rattling of the windows is prevented and at the same time the window can be raised and lowered readily and easily. Another advantage of these resilient retainers is the ease and convenience with which window glass can be positioned in the window.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a door of the character described, in combination, a side pillar, a strip secured to said pillar and having a resilient window retaining portion offset from and overhanging the edge of said pillar, window glass, and a grooved member fixed to the edge of the window glass, said offset retaining portion having a longitudinal ridge formation at its outer edge engaging in the groove of said grooved member.

2. A metal window strip comprising a base portion, an upstanding flange portion along one edge of said base portion, and a resilient finger portion along the other edge of said base portion sprung at an obtuse angle to the horizontal plane thereof, said finger portion having a window engaging means along its outer extremity.

3. In a door of the character described, in combination, a channel-shaped door pillar of which the inner wall is shorter than the outer wall, a panel having a flange, said panel flange and the outer pillar wall overlapping at the edge of the door, and a window retaining member secured to the inner pillar wall only, said retaining member having a resilient window-engaging ridge portion disposed beyond the edge of said inner pillar wall.

4. In a door of the character described, in combination, a channel-shaped door pillar of which the inner wall is shorter than the outer wall, a panel having a flange, said panel flange and the outer pillar wall overlapping at the edge of the door, and a window retaining member secured to the inner pillar wall only, said retaining member having a resilient portion disposed beyond the edge of said inner pillar wall, the outer extremity of said resilient portion being formed into a window engaging ridge, and said retaining member having a screening flange along its other edge.

5. In a door of the character described, the combination with a door frame including channel-shaped side pillars, and a top cross member, of a panel preformed with side flanges located to seat closely against the inside of the outer legs of said channel pillars and with a top flange located to closely overlap the top of the top cross member when the panel is applied to said frame.

6. In a door of the character described, the combination with a door frame including channel-shaped side pillars and top and bottom cross members, of a panel preformed with side flanges located to seat closely against the inside of the outer legs of said channel pillars and with top and bottom flanges located to closely overlap the top and bottom cross members when the panel is applied to said frame.

7. In a door of the character described, the combination with a door frame including channel-shaped side pillars, a top cross member, of a panel preformed with side flanges located to seat closely against the inside of the outer legs of said channel pillars and with a top flange located to closely overlap the top of the top cross member when the panel is applied to said frame, and resilient window runway strips secured to said side pillars and to said top cross member.

8. In a door of the character described, the combination with a door frame including channel-shaped side pillars, a top cross member, of a panel preformed with side flanges located to seat closely against the inside of the outer legs of said channel pillars and with a top flange located to closely overlap the top of the top cross member when the panel is applied to said frame, and resilient window runway strips secured to said side pillars and to said top cross member, each of said strips having an offset resilient window engaging ridge formation.

9. In a door of the character described, the combination with a door frame including channel-shaped side pillars, a top cross member, of a panel preformed with side flanges located to seat closely against the inside of the outer legs of said channel pillars and with a top flange located to closely overlap the top of the top cross member when the panel is applied to said frame, and resilient window runway strips secured to said side pillars and to said top cross member, said strips having along one edge an offset resilient window engaging ridge formation and having a screening flange along the other edge.

10. In a door of the character described, in combination, a channel shaped door pillar of which the inner wall is shorter than the outer wall, a panel having a doubled over portion overlapping the outer pillar wall, and a flange portion substantially at right angles to the doubled over portion and secured to the inner face of said outer pillar wall, said panel being spaced from the inner pillar wall a distance sufficient to permit the insertion of a welding tool between the pillar and panel into operative contact with said inturned flange.

This specification signed this 30th day of November, 1926.

ALBERT L. LAMBERT.